MAGNETIC FILM MEMORY WITH CREEP PREVENTION MEANS

Filed Jan. 13, 1964 Sheet 1 of 2

INVENTORS
HSU CHANG
CHARLES DENIS MEE
SIMON MIDDELHOEK
OTTO VOEGELI

BY Stephen J. Limanek
ATTORNEY

MAGNETIC FILM MEMORY WITH CREEP PREVENTION MEANS

Filed Jan. 13, 1964

United States Patent Office 3,440,623

Patented Apr. 22, 1969

3,440,623

MAGNETIC FILM MEMORY WITH CREEP PREVENTION MEANS

Hsu Chang, Peekskill, and Charles Denis Mee, Yorktown Heights, N.Y., Otto Voegeli, West Lafayette, Ind., and Simon Middelhoek, Kilchberg, Switzerland, assignors to International Business Machines Corporation, New York, N.Y., a corporation of New York Filed Jan. 13, 1964, Ser. No. 337,199

Int. Cl. G11b *5/64;* G11c *11/14, 11/10*

U.S. Cl. 340—174 16 Claims

ABSTRACT OF THE DISCLOSURE

Wall creeping effects caused by stray alternating magnetic fields in the hard direction of magnetization are apt to render magnetic film storage devices unduly disturb-sensitive. To prevent wall creep, it is proposed herein to subject each magnetic storage film to a constant magnetic bias field which is effectively applied along the hard axis of the film, such bias field having a magnitude in the range from 0.2 to 0.3 of the anisotropy field $H_K$ of the film.

Figures 1, 2:
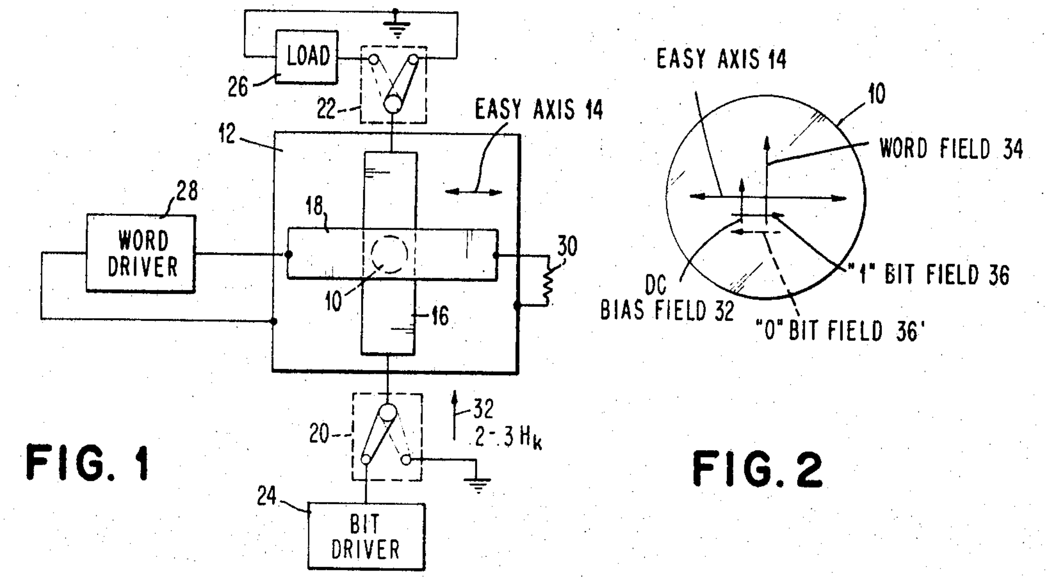

This invention relates to magnetic film storage systems and more particularly to improved magnetic systems in which the films thereof are less sensitive to disturb fields.

A toroidal magnetic core having a square hysteresis loop can be switched by applying simultaneously thereto two magnetic field pulses, while the application of either of the pulses any number of times does not affect the magnetic state of the core. It is known that the simultaneous application of two magnetic field pulses to a magnetic thin film having uniaxial anisotropy switches or reverses the magnetic state of the film but that often repeated applications of one of the two pulses also causes, by a creeping action, a switching or destruction of the original or stored information in a film. This undesired creeping, which is a domain wall creeping, in magnetic storage films is brought about in magnetic film memory systems by disturb magnetic fields which, for example, may be partial or half select or stray fields.

It is also known that magnetization reversals in magnetic films proceed by wall motion or incoherent or coherent rotation and that magnetic fields having given resultant vectorial values in a magnetic film produce no creeping or less creeping in films than do fields of other values.

It was observed by S. Middelhoek, IBM Journal of Research and Development, January 1962, pp. 140–141, that wall creeping is produced in both thick and thin magnetic films when the films are subjected to alternating current magnetic fields in the hard direction. The wall creeping processes in thick magnetic films is explained by transitions between Block and Néel walls and in thin films where cross-tie walls occur by motions of the Bloch lines between oppositely magnetized Néel wall segments of the cross-tie walls. Since in word oriented memory systems, such as, the two dimensional arrays, the word field in a selected word or line can produce a strong disturb field in the hard direction in the magnetic elements associated with words or lines adjacent to the selected word, it has not been possible heretofore to provide reliable, simple and compact magnetic film arrays for memory systems.

It is an object of this invention to provide a magnetic storage system in which creep in its films is substantially reduced or eliminated.

Another object of this invention is to provide a magnetic storage system in which creep in both thick and thin films is reduced or eliminated.

A further object of this invention is to provide a magnetic film storage system in which disturb fields applied in the hard direction of the films are prevented from destroying information stored in the films.

In accordance with the present invention, a magnetic film storage system is provided which includes a bias magnetic field applied to each of the films of the system in the hard direction so as to prevent a transition of the magnetic field in the haɪd direction at a value at which the creep velocity is ma:timum, i.e., at approximately a value in the range from 0.2 $H_K$ to 0.3 $H_K$ is the uniaxial anisotropy field of the film.

An important advantage of this invention is that virtually creep free magnetic film systems are provided.

An important feature of this invention is that the creep free magnetic film storage systems are provided without necessitating small magnetic field tolerances or widely spacing the magnetic films.

The foregoing and other objects, features and advantages of the invention will be apparent from the following more particular description of preferred embodiments of the invention, as illustrated in the accompanying drawings.

Figure 3:
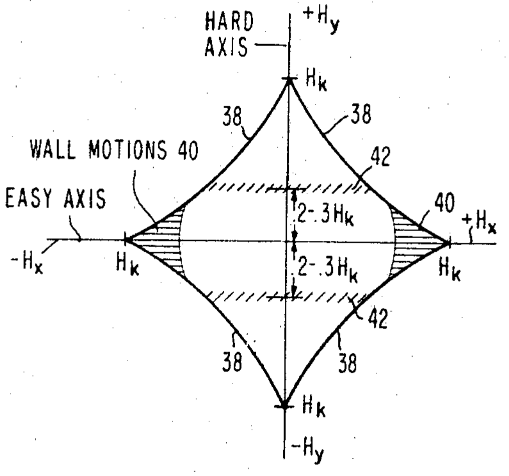
Figure 4:
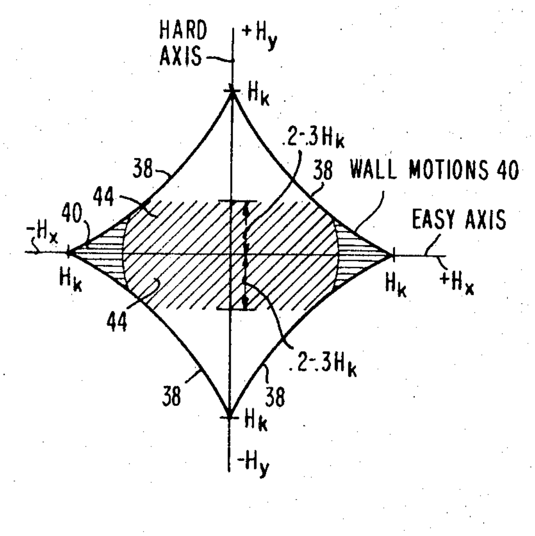
Figure 5:
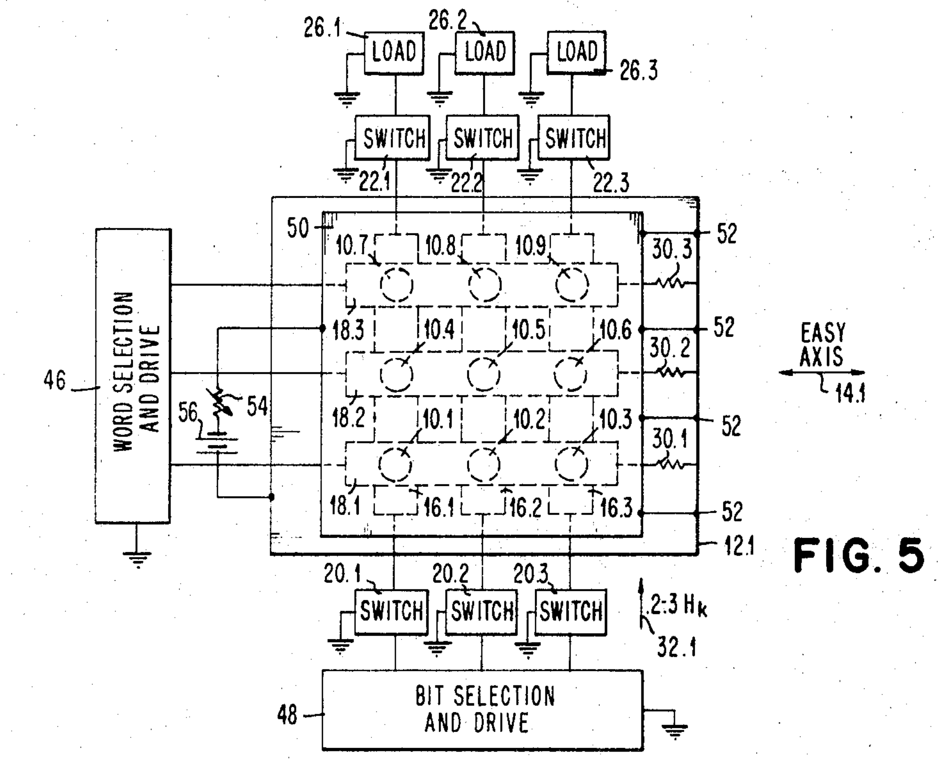
Figure 6:
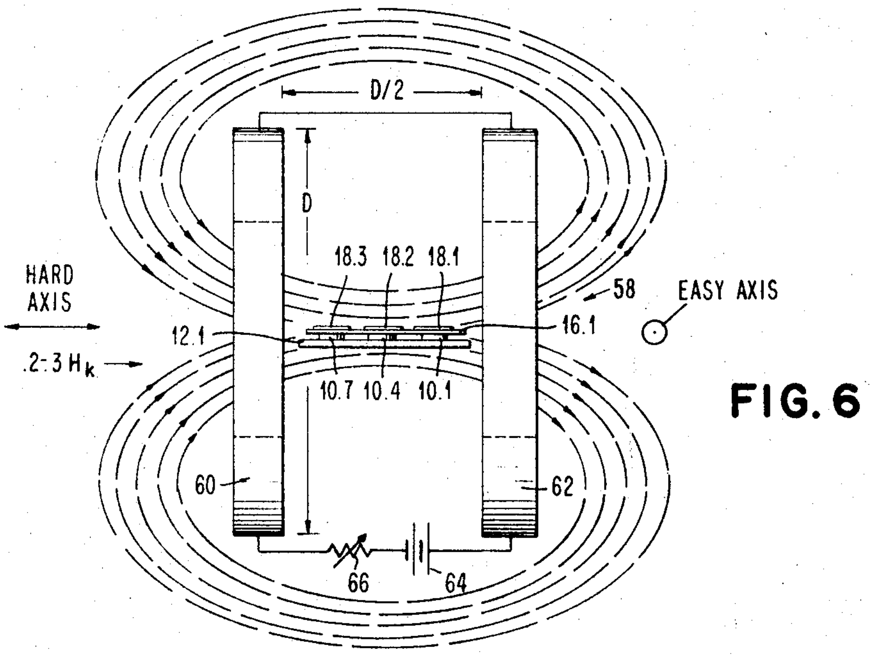

In the drawings:

FIG. 1 illustrates an embodiment of the magnetic storage system of the present invention showing only one storage film element of the system, FIG. 2 indicates the relationship of the magnetic fields applied to the storage element of FIG. 1 to the easy axis of that element, FIG. 3 shows critical curves for a thick storage film element which may be used in the system illustrated in FIG. 1, FIG. 4 shows critical curves for a thin storage film element which may be used in the system illustrated in FIG. 1, FIG. 5 illustrates an embodiment of the magnetic storage system of the present invention wherein a bias magnetic field is produced by a wide strip line, and FIG. 6 illustrates an embodiment of the magnetic storage system of the present invention wherein a bias magnetic field is produced by a Helmholtz coil arrangement.

Referring to the drawings in more detail, there is shown in FIG. 1 an embodiment of the magnetic storage system of the present invention which for purposes of illustration only is limited to a single magnetic film 10 deposited on a substrate 12, for example, an electrically conductive ground plane. The easy axis of the film 10 is indicated by the double-headed arrrow 14 as being in the horizontal direction. A first or bit line 16 is deposited over the film 10 on the substrate or ground plane 12 in a direction orthogonal to the easy axis 14 of the film 10 and a second or word lnie 18 is also deposited over the film 10 on the substrate or ground plane 12 but in a direction parallel to that of the easy axis 14. The magnetic film 10, which may be made of permalloy or nickel-iron alloy, as is well known, is illustrated as having a circular shape but it may have other shapes, such as rectangular, if desired. The bit and word lines 16 and 18 are preferably strip lines having a width at least as wide as the diameter of the film 10 with overlapping portions of the lines 16 and 18 disposed directly above the film 10. A layer of insulation (not shown), for example, of silicon monoxide, is interposed between the two lines 16 and 18 and insulating layers may be provided on each side of the film 10. The bit line 16 is connected at one end to a first switching means 20 and at the other end to a second switching means 22. The first switching means 20 is operative to connect the one end of the bit line 16 either to a bit driver or generator 24 or to ground, while the second switching means 22 is operative to connect the other end of the bit line 16 either to ground or to a load 26, which may be a conventional sense amplifier. The word line 18 is connected at one end to a word driver or generator 28 and at the other end to the characteristic impedance 30 of the word line 18. The first and second switching means 20 and 22 are preferably ganged so that when the one end of bit line 16 is connected to the bit driver 24 by the first switching means 20, the other end of the bit line 16 is connected to ground by the second switching means 22 and, when the other end of the bit line 16 is connected by the second switching means 22 to the load 26, the one end of the bit line 16 is connected by the first switching means 20 to ground. By providing the first and second switching means 20 and 22 the bit line 16 can act as a common bit and sense line. If the switching means 20 and 22 are not used, a third line similar to the bit line 16 is provided as a sense line. Of course, if desired, an end of the bit line 16 may also be selectively terminated by its characteristic impedance instead of being connected directly to ground. When the substrate 12 is a ground plane, it is used as the return path for the bit and word lines. Means, indicated only by an arrow 32, are provided to produce a direct current magnetic bias field having a value at least equal to 0.2 $H_k$.

As indicated in FIG. 2 of the drawing a direct current bias magnetic field 32 and a word magnetic field 34 are produced in the plane of the film 10 in a direction perpendicular to the easy axis 14 of the film 10, a "1" bit magnetic field 36 is produced in the plane of the film 10 in a given direction parallel to the easy axis 14 and a "0" bit magnetic field 36' is produced in a direction opposite to the given direction of the "1" bit magnetic field.

The switching behavior of the magnetic films which may be used as the magnetic storage elements in the system of the present invention may best be explained by referring to the curves shown in FIGS. 3 and 4 of the drawing where FIG. 3 indicates the switching behavior of thick magnetic films, i.e., films having a thickness greater than about 900 Angstroms, and where FIG. 4 indicates the switching behavior of thin magnetic films, i.e., films having a thickness less than approximately 900 Angstroms. The preferred magnetization direction, i.e., the easy axis of the films, which is present due to the uniaxial magnetic anisotropy in the film, corresponds to the $H_x$ axis and the direction perpendicular to the easy axis, i.e., the hard axis, corresponds to the $H_y$ axis. The anisotropy field strength, corresponding to the uniaxial magnetic anisotropy constant $k$, is indicated by $H_k=2k/M$, M being the magnetization, which may be of a value of about 5 to 15 oersteds. The rotational switching critical curve having four portions enclosing a given area forming an asteroid defines the minimum limits of externally applied magnetic fields required to rotationally switch or reverse the magnetic state of one of the films. A magnetic field or a combination of magnetic fields having a resultant magnitude falling without the asteroids irreversibly switches the film by the fast rotational process. The films are also irreversibly switched but at a slower rate of speed by wall motions when applied magnetic fields fall within the horizontally shaded areas 40 of the asteroids. If direct current magnetic fields have magnitudes within the asteroids of FIG. 3 or 4 but without the wall motion areas 40, the films neither switch nor creep. However, as explained in the above identified IBM Journal of Research and Development article, if the magnetic field applied to the films has an alternating current component in the hard direction, i.e., along the $H_y$ axis, passing through a value of 0.3 $H_k$, which is now known to extend from approximately 0.2 $H_k$ to 0.3 $H_k$, the magnetization in the films will creep and the stored information will subsequently be destroyed by the creeping process. If the film is a thick film, i.e., greater than approximately 900 Angstroms, the creep is produced by Block-Néel-Block wall transitions which occur at hard direction magnetic fields of about 0.2 $H_k$ to 0.3 $H_k$, indicated at diagonally shaded lines 42 in FIG. 3, and, if the film is a thin film, i.e., of a thickness less than about 900 Angstroms, the creep is produced by Block line motions in cross-tie walls which occur at hard direction magnetic fields from about 0.3 $H_k$ to 0, indicated at diagonally shaded area 44 in FIG. 4 of the drawings.

In the operation of the system of the present invention illustrated in FIG. 1 of the drawing when the film 10 is either a thick or a thin film, a direct current bias field 32 having a value at least equal to 0.2 $H_k$ at the film 10 is applied to the film 10 continuously by any suitable means such as will be described hereinbelow in connection with the system illustrated in FIGS. 5 and 6 of the drawing. In order to write a "1" bit of information into film 10, the word field 34, indicated in FIG. 2, having a magnitude of approximately twice that of $H_k$ is applied to the film 10 in the hard direction by passing current through the word line 18 from the word driver 28 and the "1" bit field 36, indicated in FIG. 2, having a magnitude of only a small fraction of that of $H_k$ is concurrently applied to the film 10 along the easy axis in the direction of arrow 36 of FIG. 2 by passing current through the bit line 16 from the bit driver 24 with the switching means 20 and 22 positioned as indicated by solid lines in FIG. 1 of the drawings. By removing the word field 34 prior to removing the "1" bit field 36 the film 10 becomes magnetized in the $+H_x$ direction by a rotational process to store the "1" bit of information in film 10. To store a "0" bit of information the film 10 is magnetized in the $-H_x$ direction by applying the "0" bit field 36' instead of the "1" bit field. The "1" and"0" bit fields are produced by currents of opposite polarities from the bit driver 24. When the information in the film 10 is to be read, the switching means 20 and 22 are adjusted to the switch positions indicated by dashed lines in FIG. 1 and a read word field is applied to the film 10 in the direction of the direct current bias field 32 having a value such that the sum of the bias and read word fields do not exceed $H_k$. This reading procedure provides a nondestructive mode of operation producing signals of opposite polarities in the load 26 to indicate "0" and "1" bits of information.

With the film 10 biased at 0.2 $H_k$ to 0.3 $H_k$, depending upon the particular film used, disturb fields along the hard axis in the direction of the bias field 32 can have magnitudes up to 0.7 $H_k$ to 0.8 $H_k$ before uncontrolled switching takes place in the film 10. Since only a unipolar word drive pulse is required in the memory system, it can be seen that the polarity of this pulse can be chosen so that the disturb field direction from other word lines of the system corresponds to that of the bias field 32.

When thin films are used in the system of the present invention, the hard axis bias field of approximately 0.2 $H_k$ to 0.3 $H_k$ must be directed so as to correspond with the direction of the disturb fields from adjacent word lines, since creep occurs in thin films by Bloch line motions for any alternating current magnetic field values from 0 to 0.3 $H_k$. However, when thick films are employed in the system of the invention, the hard axis bias field may be directed so as to correspond with the direction of the disturb fields from adjacent word lines or alternatively it may be directed so as to oppose these disturb fields. This alternative arrangement of bias field is possible since in thick films creep occurs by Bloch-Néel-Bloch wall transitions at hard direction values of only approximately 0.2 $H_k$ to 0.3 $H_k$ in both the $+H_y$ and $-H_y$ directions. Thus, these disturb field transitions may be reduced or eliminated in thick films by utilizing a hard axis bias field of at least 0.2 $H_k$ directed so as to correspond with the direction of the disturb fields from adjacent word lines or by utilizing a hard axis bias field of not more than 0.3 $H_k$ directed so as to oppose these disturb fields. This latter arrangement permits the application of disturb fields in the hard direction of approximately 0.6 $H_k$ to the thick film without the film being subjected to the creeping process.

Accordingly, it can be seen that by the practice of this invention the undesirable creeping process in magnetic films can be greatly reduced or even entirely eliminated particularly when the creeping process is caused by known stray magnetic fields such as from adjacent word lines. It should, of course, be understood that the films of the system may also be subjected to occasional random stray fields which are externally produced. These random fields may be eliminated or at least reduced by known shielding means to such an extent that magnetic state reversals will not be produced by the creeping process.

In FIG. 5 of the drawing there is illustrated an embodiment of the system of the invention with a plurality of word and bit lines and a circuit for producing the hard axis bias magnetic field. The system is word organized having a plurality of vertical bit lines 16.1, 16.2 and 16.3 and a plurality of horizontal word lines 18.1, 18.2 and 18.3. Beneath each of the intersections of the bit and word lines there is disposed one of a plurality of magnetic films 10.1–10.9 deposited on a ground plane 12.1, arranged in the manner described hereinabove in connection with the system illustrated in FIG. 1 of the drawing. The word lines 18.1, 18.2 and 18.3 have one end connected to the ground plane 12.1 through a respective word line terminating impedance 30.1, 30.2 and 30.3 while the other end is connected to a word selection and drive means 46 capable of providing address selections of a particular word line 18.1, 18.2 or 18.3 and the pulse generation corresponding to word driver 28 of the system of FIG. 1. The bit lines 16.1, 16.2 and 16.3 are connected to a bit selection and drive means 48 through a respective switch 20.1, 20.2 and 20.3 and are further connected to loads 26.1, 26.2 and 26.3 through a respective switch 22.1, 22.2 and 22.3 The means 48 provides the function of bit addressing and pulse generating corresponding to the bit driver 24 of FIG. 1 while each switch 20.1, 20.2 and 20.3 corresponds to the switch 20 and each switch 22.1, 22.2 and 22.3 corresponds to the switch 22 of FIG. 1. A wide electrical conductor or strip line 50 is disposed over the ground plane 12.1 so as to cover each of the magnetic films 10.1 to 10.9. One end of the wide strip line 50 is connected to one end of the ground plane 12.1 at one or more points 52 and the opposite end of the wide strip line 50 is connected at one or more points through a variable resistor 54 and a direct current source such as a battery 56 to an opposite end of the ground plane 12.1. The easy axis of the magnetic films 10.1 to 10.9 is indicated by the horizontal, double-headed arrow 14.1.

In the operation of the system illustrated in FIG. 5 of the drawing, the value of the resistor 54 is adjusted so as to pass through the wide strip line 50 a current having a magnitude sufficient to produce at each of the magnetic films 10.1 to 10.9 a magnetic field, indicated by arrow 32.1 in the hard direction having a value of at least and approximately 0.2 $H_k$, depending upon the film used. When "1" and "0" bits of information are to be written into film elements, for example 10.4, 10.5 and 10.6, of a word line, for example, 18.2, the word select and drive means 46 is operated to pass a current through the word line 18.2 having a magnitude sufficient to produce at each of the film elements 10.4, 10.5 and 10.6, a magnetic field having a value of approximately 2 $H_k$ along the hard axis in the direction of the 0.2 $H_k$ bias field and the bit selection and drive means is operated to pass through the bit lines 16.1, 16.2 and 16.3 currents, in partial concurrence with the current passing through the word line 18.2, of polarities corresponding to the bit or digital information to be stored, in the manner described hereinabove in connection with the writing of "1" and "0" bits of information in the film 10 of the system of FIG. 1. It can be seen that when large currents are passed through the word line 18.2 stray magnetic fields from the word line 18.2 produce disturb fields in the film elements 10.1, 10.2 and 10.3 and 10.7, 10.8 and 10.9 of the two adjacent word lines 18.1 and 18.3, respectively. Since the disturb field magnitude, in a system of the invention which operated satisfactorily, was found to be not greater than 10 to 15% of the 2 $H_k$ field produced in the magnetic elements 10.4, 10.5 and 10.6 of the word line 18.2 even with the word lines closely spaced with respect to each other, it can be seen that the alternating current field variations at the film elements of the adjacent lines 18.1 and 18.3 have magnitudes in the range from approximately 0.3 $H_k$ to $H_k$, a range of values which, as indicated in the asteroids of FIG. 3 and FIG. 4 do not produce creep in either the thin or thick magnetic films. When the information stored in the magnetic elements 10.4, 10.5 and 10.6 of the word line 18.2 is to be read out, the word selection and drive means 46 passes a current through the word line 18.2 having a magnitude such that there is produced at the magnetic elements 10.4, 10.5 and 10.6 a field of less than $H_k$ in the direction of the 0.2 $H_k$ bias field. When the read field is removed the magnetization in the films is restored to the original store position, providing a nondestructive reading mode. Information is written into and read out of the film elements associated with word lines 18.1 and 18.3 in a manner similar to that described hereinabove in connection with the handling of information in word line 18.2 by operation of the word and bit selection and drive means 46 and 48.

In FIG. 6 of the drawing there is illustrated a Helmholtz coil arrangement 58 for producing a homogeneous field to 0.2 $H_k$ to 0.3 $H_k$ at each of the magnetic film elements of the memory system. The Helmholtz coil arrangement 58 is shown in FIG. 6 in its relationship to the planar structure illustrated in FIG. 5 with the wide strip conductor 50 removed therefrom. The system of FIG. 6 is similar to that of the system of FIG. 5 but differs therefrom in that the Helmholtz coil arrangement replaces the wide strip conductor arrangement of FIG. 5 for producing the homogeneous or uniform bias magnetic field. The Helmholtz coil arrangement 58 includes a pair of serially connected magnetic coils 60 and 62 which are energized by a direct current source such as a battery 64 through a serially disposed variable resistor 66. As is known, an extremely uniform magnetic field may be produced by the Helmholtz coil arrangement 50 between the two coils 60 and 62 at the common axis thereof where the planar structure of FIG. 5, indicated only by ground plane 12.1, magnetic elements 10.1, 10.4 and 10.7, bit line 16.1 and word lines 18.1, 18.2 and 18.3, is disposed when the spacing between the coils 60 and 62 is equal to one half of the diameter D of each of the coils. After adjusting the bias field to the desired hard direction field in the range from 0.2 $H_k$ to 0.3 $H_k$ by the Helmholtz coil arrangement 58, the system illustrated in FIG. 6 of the drawing operates in a manner similar to that described in connection with the system illustrated in FIG. 5 of the drawing.

In each of the embodiments of the system of the present invention, the bias magnetic field is applied to the films of the system so that at all times during the application of stray fields to the films only Néel walls occur when thin films are employed and only Néel walls or only Bloch walls occur in thick films, transitions therebetween being eliminated. It should be noted that when the word field at a film element is to be applied in the direction of the bias field, its magnitude may be decreased by the amount of the bias field. An advantage of the smaller word field is that the stray field in the film elements of the adjacent word lines is decreased. However, the output from the film element also decreases because the magnetization does not return to the easy axis. Due to the presence of the bias field the magnetization remains at an angle of about 15° to the easy axis. Since cos 15°=0.966 the effect on the output signal is negligible.

It should be understood that the teachings of the present invention are applicable to systems having two or three dimensional magnetic film memory arrays and conducting or non-conducting film substrates and that invention is not limited to bit lines arranged orthogonally with respect to the word lines. Furthermore, the magnetic films may be made of nickel-iron alloys, such as, an 80% nickel-20% iron alloy, or other suitable magnetic material wherein thin films have a limited Bloch line motion area within the critical curve of the film and thick films have a defined transition between Néel and Bloch walls. Uniaxial anisotropy may be induced in the film in any known manner.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory system comprising:
(a) a magnetic film having uniaxial anisotropy and capable of having Bloch and Néel walls produced therein with transitions therebteween,
(b) means for applying magnetic pulse fields to said film for storing information therein,
(c) means for applying to said film a constant bias field effective only in the hard direction of said film to prevent stray magnetic fields from producing transitions in said film and,
(d) means for reading the stored information from said film.

2. A memory system as set forth in claim 1 wherein said film has an uniaxial anisotropy field $H_k$ and wherein said bias field applying means applies a constant bias magnetic field approximately from 0.2 $H_k$ to 0.3 $H_k$.

3. A memory system comprising:
(a) a magnetic thick film having uniaxial anisotropy and capable of having Bloch and Néel walls produced therein,
(b) means for applying magnetic pulse fields to said film for storing information therein,
(c) means for applying to said film a constant bias magnetic field effective only in the hard direction of said film to prevent stray magnetic fields from producing both Bloch and Néel walls in said film, and
(d) means for reading the stored information from said film.

4. A memory system as set forth in claim 3 wherein said thick film has a uniaxial anisotropy field $H_k$ and wherein said bias field applying means applies a constant bias magnetic field approximately from 0.2 $H_k$ to 0.3 $H_k$ 5. A memory system comprising:
(a) a magnetic thin film having uniaxial anisotropy and capable of sustaining Bloch line motions,
(b) means for applying magnetic pulse fields to said film for storing information therein,
(c) means for applying to said film a constant bias magnetic field effective only in the hard direction of said film to prevent stray magnetic fields from producing Bloch line motions in said film and,
(d) means for reading the stored information from said film.

6. A memory system as set forth in claim 5 wherein said film has a uniaxial anisotropy field $H_k$ and wherein said bias field applying means applies a constant bias field approximately from 0.2 $H_k$ to 0.3 $H_k$ to said film.

7. A memory system comprising:
(a) a plurality of magnetic films each having uniaxial anisotropy and capable of having Bloch and Néel walls produced therein with transitions therebetween,
(b) means including a magnetic pulse field for handling information in one of said films which applies a stray field to another of said films in a given hard magnetic direction, and
(c) means for applying a constant bias magnetic field to said another film effective only in said hard direction to prevent the stray field from producing said transitions in said another film.

8. A memory system as set forth in claim 7 wherein each of said films has an uniaxial anisotropy field $H_k$ and wherein said bias field applying means applies a constant bias magnetic field approximately from 0.2 $H_k$ to 0.3 $H_k$.

9. A memory system as set forth in claim 8 wherein said bias field applying means applies a constant bias magnetic field having a magnitude greater than 0.2 $H_k$ in said given magnetic direction.

10. A memory system as set forth in claim 8 wherein said bias field applying means applies a constant bias magnetic field having a magnitude less than 0.3 $H_k$ in a direction opposite to said given hard magnetic direction.

11. A memory system comprising:
(a) a plurality of magnetic thick films each having uniaxial anisotropy and capable of having Bloch and Néel walls,
(b) means including a magnetic pulse field for handling information in one of said films which applies a stray field to another of said films in a given hard magnetic direction, and
(c) means for applying a constant bias magnetic field to said another film effective only in said hard direction to prevent said stray field from producing both Bloch and Néel walls.

12. A memory system as set forth in claim 11 wherein each of said films has a uniaxial anisotropy field $H_k$ and wherein said bias field applying means applies a constant bias magnetic field approximately from 0.2 $H_k$ to 0.3 $H_k$.

13. A memory system as set forth in claim 12 wherein said bias field applying means applies a constant bias magnetic field having a magnitude greater than 0.2 $H_k$ in said given hard magnetic direction.

14. A memory system as set forth in claim 12 wherein said bias field applying means applies a constant bias magnetic field having a magnitude less 0.3 $H_k$ in a direction opposite to that of said given hard direction.

15. A memory system comprising:
(a) a plurality of magnetic thin films each having uniaxial anisotropy and capable of sustaining Block line motions,
(b) means including a magnetic pulse field for handling information in one of said films which applies a stray field to another of said films in a given hard magnetic direction, and
(c) means for applying a constant bias magnetic field to said another film effective only in said hard direction to prevent said stray magnetic field from producing said Bloch line motions in said film.

16. A memory system as set forth in claim 15 wherein each of said films has an uniaxial anisotropy field $H_k$ and wherein said bias field applying means applies a constant bias magnetic field approximately from 0.2 $H_k$ to 0.3 $H_k$ in said given hard magnetic direction.

References Cited

UNITED STATES PATENTS

| | | | |
|---|---|---|---|
| 3,244,901 | 4/1966 | Oguey | 340—174 |
| 3,252,152 | 5/1966 | Davis et al. | 340—174 |
| 3,278,914 | 10/1966 | Rashleigh et al. | 340—174 |

BERNARD KONICK, *Primary Examiner.*

VINCENT P. CANNEY, *Assistant Examiner.*